(12) United States Patent
Tsuruta

(10) Patent No.: US 9,885,596 B2
(45) Date of Patent: Feb. 6, 2018

(54) OIL LEVEL GAUGE

(71) Applicant: TOYOTA JIDOSHA KABUSHIKI KAISHA, Toyota-shi (JP)

(72) Inventor: Tomoyuki Tsuruta, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 188 days.

(21) Appl. No.: 15/071,814

(22) Filed: Mar. 16, 2016

(65) Prior Publication Data

US 2016/0282166 A1 Sep. 29, 2016

(30) Foreign Application Priority Data

Mar. 23, 2015 (JP) ................................. 2015-059839

(51) Int. Cl.
*G01F 23/04* (2006.01)

(52) U.S. Cl.
CPC .................................... *G01F 23/04* (2013.01)

(58) Field of Classification Search
CPC ....................................................... G01F 23/04
USPC .................................................. 116/722–731
See application file for complete search history.

(56) References Cited

U.S. PATENT DOCUMENTS

| 3,594,906 A | * | 7/1971 | Kerfoot | G01F 23/04 33/717 |
| 5,613,303 A | * | 3/1997 | Kayano et al. | G01F 23/04 33/722 |

FOREIGN PATENT DOCUMENTS

| DE | 29616484 U1 | * | 11/1996 | ............. G01F 23/04 |
| DE | 19601732 C1 | * | 5/1997 | ............. G01F 23/04 |
| DE | 102012009377 A1 | * | 11/2013 | ............. F01M 11/12 |
| EP | 547384 A1 | * | 6/1993 | ............. G01F 23/04 |
| FR | 2913721 A1 | * | 9/2008 | ............. F01M 11/02 |
| JP | 06174528 A | * | 6/1994 | ............. G06F 23/04 |
| JP | 8-159843 A | | 6/1996 | |
| JP | 2013-83167 | | 5/2013 | |

* cited by examiner

*Primary Examiner* — R. A. Smith
(74) *Attorney, Agent, or Firm* — Oblon, McClelland, Maier & Neustadt, L.L.P.

(57) ABSTRACT

A body of an oil level gauge includes an upper end, a lower end, a surface, a measurement portion, and a projecting portion. The projecting portion includes a middle portion and a lower portion. The middle portion is located at a center in the width direction of the body in the projecting portion. A first slope surface is inclined from the middle portion in the lower portion to a first end in the width direction in the lower portion. A second slope surface is inclined from the middle portion in the lower portion to a second end in the width direction in the lower portion. The middle portion is a part of the projecting portion located at a farthest position from the surface in a direction vertical to the surface. The middle portion is located closer to the upper end than the first end and the second end.

5 Claims, 4 Drawing Sheets

DOWNWARD
(FORWARD IN
INSERTING DIRECTION)

UPWARD
(REARWARD IN
INSERTING DIRECTION)

OIL LEVEL GAUGE

INCORPORATION BY REFERENCE

The disclosure of Japanese Patent Application No. 2015-059839 filed on Mar. 23, 2015 including the specification, drawings and abstract is incorporated herein by reference in its entirety.

BACKGROUND

1. Technical Field

The present disclosure relates to an oil level gauge.

2. Description of Related Art

Japanese Patent Application Publication No. 2013-83167 discloses an oil level gauge configured to be inserted into an oil level gauge guide, and formed in a substantially belt-like shape with a predetermined width. This oil level gauge has projections, each having a chevron cross section, at two positions in a longitudinal direction (vertical direction) thereof. The two projections are provided on both sides of a measurement portion of the oil level gauge in the vertical direction. These projections prevent the measurement portion from coming into contact with an inner wall surface of the oil level gauge guide at the time of inspecting the amount of oil, thereby inhibiting oil adhering to the inner wall from moving to the measurement portion.

SUMMARY

In the above oil level gauge, when the oil level gauge is pulled out from the oil level gauge guide for the purpose of inspecting amount of oil, the oil might adhere to the projection. The adhesion of the oil to the projection is caused by contact of the projection provided upward of the measurement portion with the inner wall surface of the oil level gauge guide. The oil adhering to the projection might move downward (run down) along the surface of the projection to the measurement portion. If the oil reaches the measurement portion, this might cause difficulty in accurate measurement of an oil level.

The present disclosure provides an oil level gauge capable of accurately measuring an oil level.

The present disclosure is configured in such a manner that an oil level gauge is configured to be inserted into an oil level gauge guide, and includes a body. The body has a belt shape with a predetermined width, and includes a measurement portion configured to measure a position of an oil surface, and a projecting portion disposed more rearward in an inserting direction into the oil level gauge guide than the measurement portion. The projection portion includes a first slope surface and a second slope surface. The first slope surface and the second slope surface are positioned at a front end in the inserting direction of the projecting portion in such a manner that the first slope surface is inclined from an intermediate portion in a width direction of the front end to one end in the width direction. The first slope surface is also inclined from rearward to forward of the inserting direction. The second slope surface is inclined from the intermediate portion in the width direction of the front end to the other end in the width direction. The second slope surface is also inclined from rearward to forward of the inserting direction.

According to the above configuration, at the time of inspecting the amount of the oil, when the oil level gauge is pulled out from the oil level gauge guide, it is possible to prevent oil adhesion to the surface of the measurement portion, thus accurately measuring the oil level. In more detail, the front end of the projecting portion of the oil level gauge functions as a restricting portion to restrict a movement direction (running down direction) of the oil adhering to the projecting portion at the time of inspecting the amount of the oil. Specifically, in the above configuration, the first slope surface and the second slope surface are formed at the front end of the projecting portion in such a manner that the first slope surface extends from the intermediate portion in the width direction of the front end to one end in the width direction from rearward to forward of the inserting direction, and the second slope surface extends from the intermediate portion in the width direction of the front end to the other end in the width direction from rearward to forward of the inserting direction.

The oil adhering to the projecting portion moves downward (runs down) (forward in the inserting direction) by empty weight, and when the oil reaches the first slope surface, the oil runs down along the first slope surface to be guided to one end in the width direction of the projecting portion. Similarly, when the oil adhering to the projecting portion reaches the second slope surface, the oil runs down along the second slope surface to be guided to the other end in the width direction of the oil level gauge. In this manner, the oil adhering to the surface of the projecting portion is guided to the ends in the width direction of the projecting portion by the first slope surface and the second slope surface provided to the front end of the projecting portion of the oil level gauge guide, thus preventing running down of the oil along the surface of the body located forward in the inserting direction of the projecting portion. Through this, the oil is inhibited from reaching the measurement portion located forward in the inserting direction of the projecting portion. Accordingly, at the time of inspecting the amount of the oil, it is possible to prevent adhesion of the oil to the surface of the measurement portion, thus accurately measuring the oil level.

According to the above mentioned embodiment, the distance in the width direction between the first slope surface and the second slope surface may become gradually greater toward forward in the inserting direction.

In this case, the oil adhering to the surface of the projecting portion can be securely guided to the ends in the width direction of the projecting portion. Through this, it is possible to prevent oil adhesion to the surface of the measurement portion, thereby accurately measuring the oil level.

According to the other aspect of the disclosure, an oil level gauge configured to be inserted into an oil level gauge guide includes a body having a belt shape. The body includes an upper end, a lower end, a surface, a measurement portion, and a projecting portion. The upper end is located more upward in a vertical direction than the lower end when the oil level gauge is inserted into the oil level gauge guide. The projecting portion is located closer to the upper end than the measurement portion. The projecting portion projects from the surface. The projecting portion includes a middle portion, a lower portion, a first slope surface, and a second slope surface. The middle portion is located at a center in a width direction of the body in the projecting portion. The first slope surface and the second slope surface are located at the lower portion in the projecting portion. The first slope surface is inclined from the middle portion in the lower portion to a first end in the width direction in the lower portion. The second slope surface is also inclined from the middle portion in the lower portion to a second end in the width direction in the lower portion. The middle portion includes a most projecting position from the surface in a direction vertical to the surface. The middle portion is located closer to the upper end than the first end and the second end.

According to the above mentioned embodiment, a distance in the width direction between the first slope surface and the second slope surface may become gradually greater from the upper end to the lower end.

According to the above mentioned embodiment, the lower portion includes a recessed portion. The recessed portion is located between the first slope surface and the second slope surface. The recessed portion is concave downward in the vertical direction when the oil level gauge is inserted into the oil level gauge guide.

According to the oil level gauge of the present disclosure, when the oil level gauge is pulled out from the oil level gauge guide for the purpose of inspecting the amount of the oil, it is possible to prevent oil adhesion to the measurement portion. It is also possible to accurately measure the oil level.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of an oil level gauge will be described with reference to the drawings.

Figure 1:
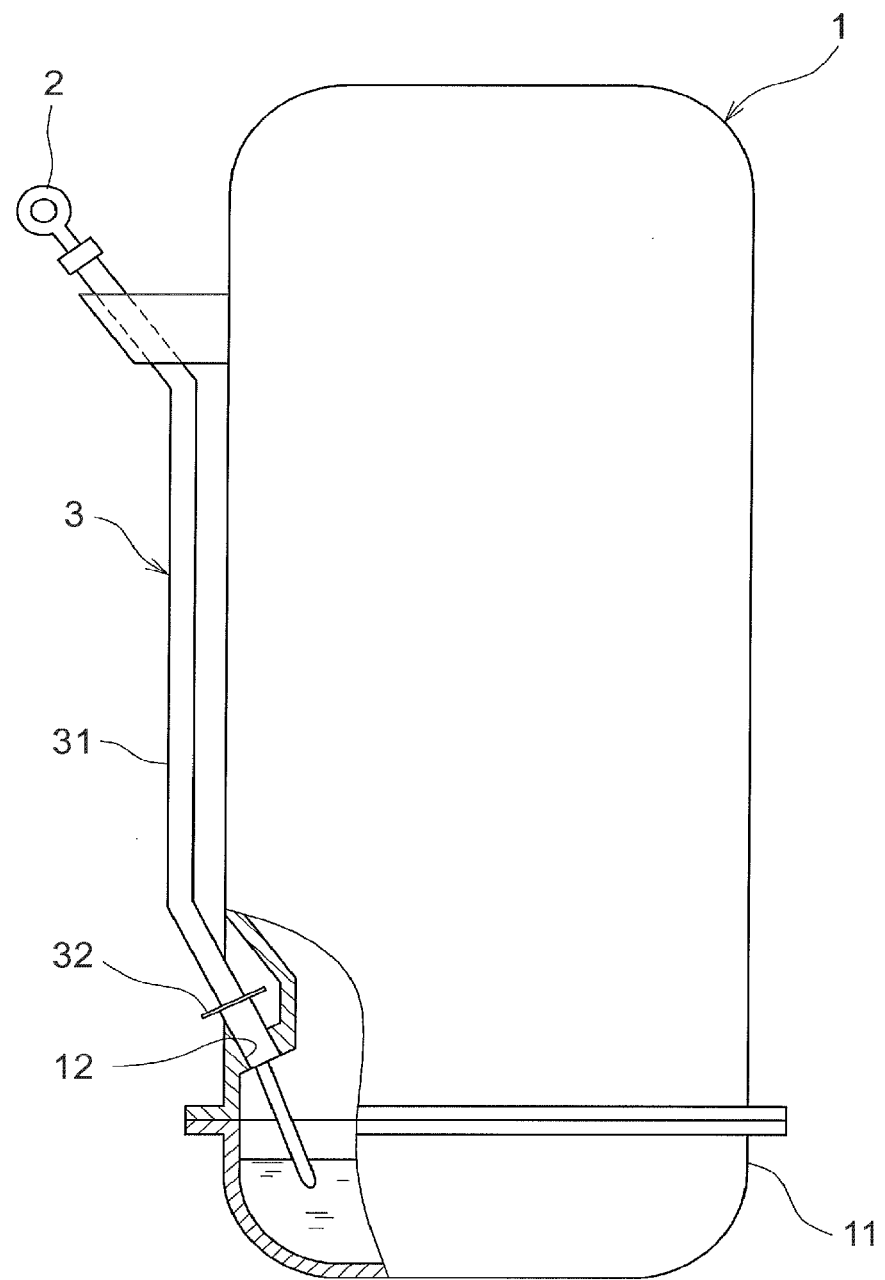
FIG. 1 is a drawing showing an example of an arrangement condition of an oil level gauge according to an embodiment to an engine.

An arrangement condition of the oil level gauge 2 according to the present embodiment will be described with reference to FIG. 1. FIG. 1 is a drawing showing an example of the arrangement condition of the oil level gauge 2 according to the present embodiment. In the example of FIG. 1, the arrangement condition of the oil level gauge 2 to an engine 1 is shown. The oil level gauge 2 is used for measuring a level of an oil (oil level) in an oil pan 11 disposed below the engine 1, specifically, a position of an oil surface of the oil reserved in the oil pan 11. The oil level is measured by the oil level gauge 2 so as to detect amount of the oil reserved in the oil pan 11.

The oil level gauge 2 is inserted in an oil level gauge guide 3. The oil level gauge guide 3 is a cylindrical member into which the oil level gauge 2 is inserted, and includes a guide body 31 and a support pipe 32. The guide body 31 is fixed to a side surface of the engine 1. The guide body 31 is formed in a bent shape in a manner as to guide a front end portion of the oil level gauge 2 (lower end of the oil level gauge 2) inserted from an aperture of an upper end of the guide body 31 into the oil pan 11. The support pipe 32 is a cylindrical member inserted into a through-hole 12 formed in a crankcase of the engine 1. The support pipe 32 is connected to a lower end of the guide body 31.

Figure 2A:
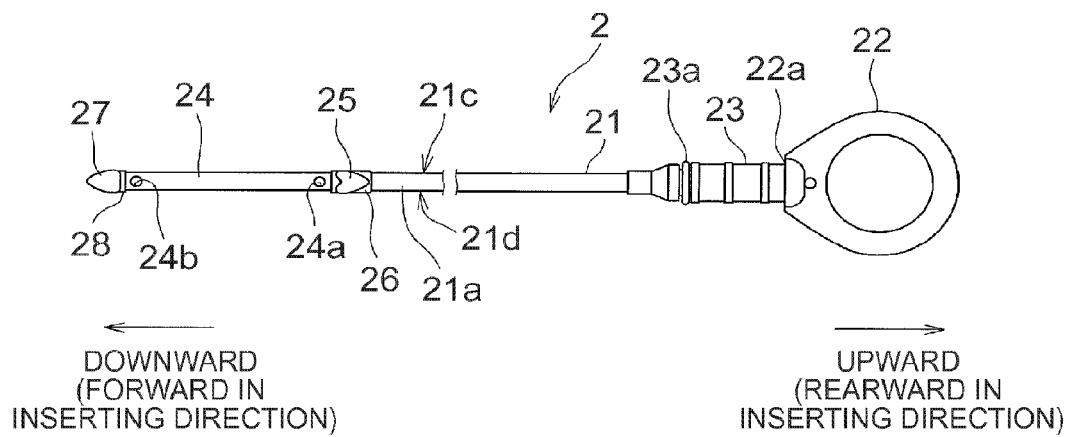
FIG. 2A and FIG. 2B are drawings showing an example of the oil level gauge according to the embodiment.
Figure 2B:
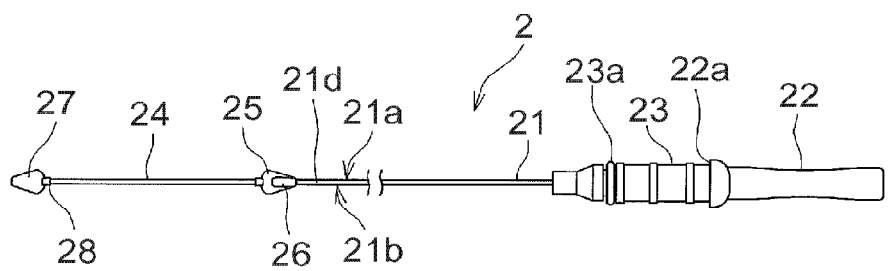
Figure 3A:
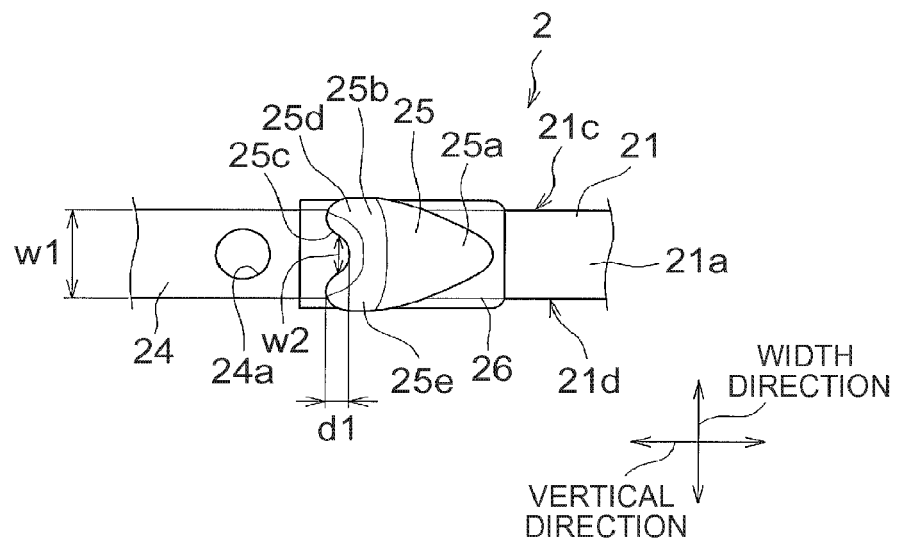
FIG. 3A and FIG. 3B are drawings of an enlarged main part of the oil level gauge of FIG. 2A and FIG. 2B.
Figure 3B:
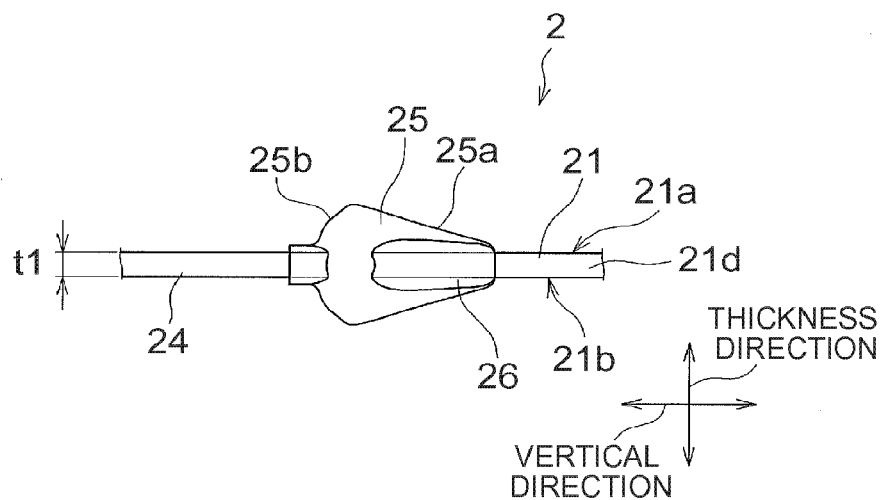
Figure 4:
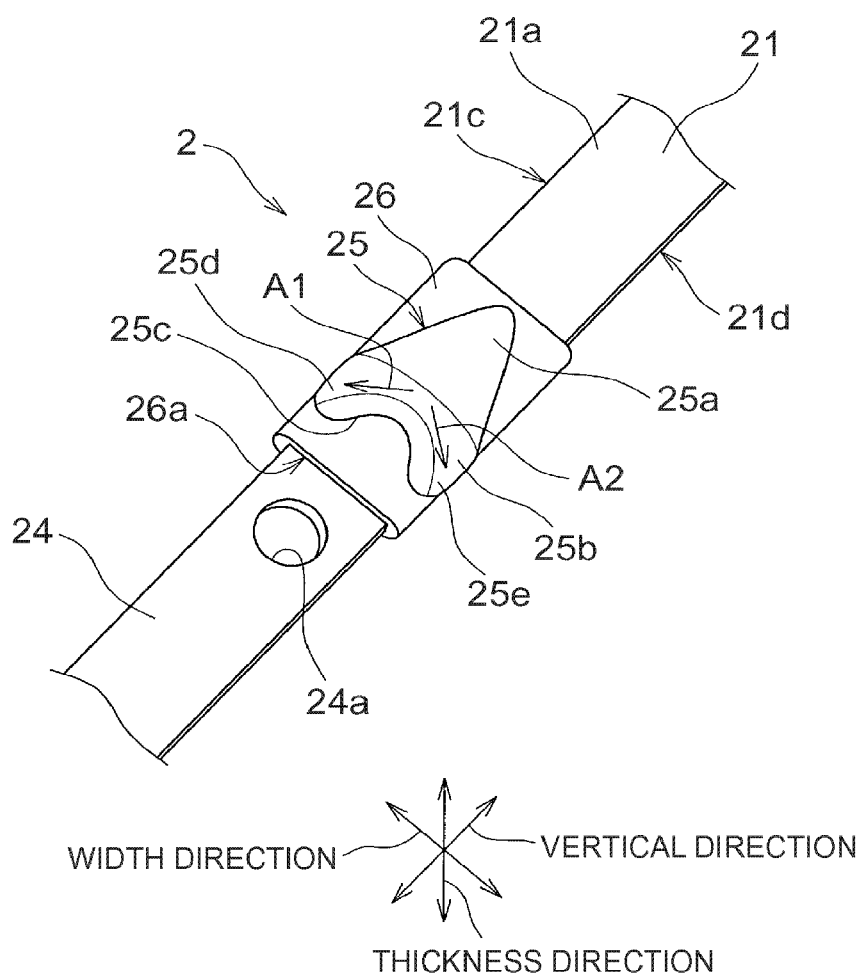
FIG. 4 is a perspective view showing a projecting portion provided to the oil level gauge of FIG. 2A and FIG. 2B.

Next, a configuration of the oil level gauge 2 according to the present embodiment will be described with reference to FIG. 2A to FIG. 4. FIG. 2A and FIG. 2B are drawings showing an example of the oil level gauge 2 according to the present embodiment, FIG. 2A is a plan view thereof, and FIG. 2B is a side view thereof. FIG. 3A and FIG. 3B are enlarged drawings of a main part of the oil level gauge 2, FIG. 3A is a plan view thereof, and FIG. 3B is a side view thereof. FIG. 4 is a perspective view showing a projecting portion 25 provided to the oil level gauge 2 of FIG. 2A and FIG. 2B. For convenience of explanation, as shown in FIG. 2A to FIG. 4, a direction in which a body 21 of the oil level gauge 2 extends (longitudinal direction) is defined as a "vertical direction". In other words, the "vertical direction" denotes a direction of inserting the oil level gauge 2 into the oil level gauge guide 3 in the arrangement condition of the oil level gauge 2 (see FIG. 1). A rearward direction of the inserting direction of the oil level gauge 2 is defined as an "upward direction", and a forward direction of the inserting direction of the oil level gauge 2 is defined as a "downward direction". A direction orthogonal to the vertical direction is defined as a "width direction" and a "thickness direction" of the body 21 of the oil level gauge 2. An end in the above "upward direction" of the body of the oil level gauge 2 is defined as an upper end thereof. An end in the above "downward direction" of the body of the oil level gauge 2 is defined as a lower end thereof.

As shown in FIG. 2A to FIG. 4, the oil level gauge 2 includes the body 21, a grip 22, and a support 23. The body 21 is formed in a substantially long belt-like shape having a width w1 and a thickness t1. The body 21 is formed of an elastic metallic material (e.g., stainless steel or the like). The body 21 is deformable corresponding to a shape of the guide body 31 of the oil level gauge guide 3. A measurement portion 24 to measure the oil level is provided to the body 21. The measurement portion 24 has a flat surface (measurement surface). Apertures 24a, 24b are provided respectively to both ends in the vertical direction of the measurement portion 24.

The measurement portion 24 is configured to be soaked in the oil reserved in the oil pan 11. The oil surface of the oil reserved in the oil pan 11 is set to be located between the apertures 24a, 24b, so that the oil adheres to a portion of the surface of the measurement portion 24 that is soaked in the oil. The oil level can be measured by comparing the position of the oil adhering to the surface of the measurement portion 24 and the respective positions of the apertures 24a, 24b.

The grip 22 is a ring-like shaped portion, and is fixed to the support 23. The grip 22 is provided with a stopper 22a to position the oil level gauge 2 in the vertical direction when the oil level gauge 2 is inserted into the guide body 31 of the oil level gauge guide 3. The support 23 is a cylindrical shaped portion having recesses and projections on an outer circumference thereof, and is connected to an upper end of the body 21. When the oil level gauge 2 is inserted into the guide body 31 of the oil level gauge guide 3, an outer circumferential surface of the support 23 comes into tight contact with an inner wall surface of the guide body 31, thereby supporting the oil level gauge 2. An O-ring 23a as a seal member is attached to the outer circumferential surface of the support 23. The O-ring 23a seals the upper end aperture of the guide body 31 so as to prevent water drops and/or foreign substances from intruding into the guide body 31.

The body 21 has the projecting portion 25 and a projecting portion 27 respectively provided on both sides of the measurement portion 24 in the vertical direction. The projecting portions 25, 27 are fixed to the body 21. One projecting portion 25 is disposed upward of the measurement portion 24, and is configured to project in the thickness direction of the body 21. The other projecting portion 27 is disposed downward of the measurement portion 24, and is configured to project in the thickness direction of the body 21. These projecting portions 25, 27 prevent the measurement portion 24 from coming into contact with the inner wall surface of the guide body 31 of the oil level gauge guide 3 at the time of inspecting the amount of the oil, thereby inhibiting the oil adhering to the inner wall surface of the guide body 31 from adhering to the surface of the measurement portion 24.

Meanwhile, at the time of inspecting the amount of the oil, when the oil level gauge 2 is pulled out from the oil level gauge guide 3, the projecting portion (projecting portion 25, herein) provided upward of the measurement portion 24 comes into contact with the inner wall surface of the guide body 31, so that the oil might adhere to the projecting portion 25. In the present embodiment, a restricting portion to restrict a movement direction (running down direction) of the oil adhering to the projecting portion 25 is provided to the oil level gauge 2. Hereinafter, this feature will be specifically described.

The projecting portion 25 is disposed upward of the measurement portion 24 in the body 21 of the oil level gauge 2 with a predetermined distance from an upper end of the measurement portion 24. The projecting portion 25 is formed by a metallic member that is a separate member from the body 21. The projecting portion 25 is fixed to the body 21. An outer frame 26 is integral with the projecting portion 25 in the outside in a plan view of the projecting portion 25. For example, the outer frame 26 is crimped to the body 21 so as to fix the projecting portion 25 to the body 21. The outer frame 26 is a cylindrical member, and the body 21 is inserted into an inner space 26a of the outer frame 26 (see FIG. 4). In a state in which the body 21 is inserted in the inner space 26a of the outer frame 26, the body 21 is crimped in a manner as to be squeezed from both sides in the thickness direction thereof by the outer frame 26, and thereby the outer frame 26 is fixed to the body 21. The projecting portion 27 is fixed substantially in the same manner as that of the projecting portion 25. An outer frame 28 is integral with the projecting portion 27 on an outer circumference of the projecting portion 27. The outer frame 28 is crimped to the body 21, thereby fixing the projecting portion 27 to the body 21.

As shown in FIG. 2B and FIG. 3B, in a side view, the projecting portion 25 is configured to project in a substantially chevron shape (substantially rectangular shape) from a front surface 21a of the body 21 in one direction of the thickness direction of the body 21. The projecting portion 25 is also configured to project in a substantially chevron shape (substantially rectangular shape) from a back surface 21b of the body 21 in the other direction of the thickness direction of the body 21. These two projections of the projecting portion 25 have the same shape on the front surface 21a and the back surface 21b of the body 21. Hereinafter, of the two projections of the projecting portion 25, the projection disposed on the front surface 21a of the body 21 will be described. Description of the other projection of the two projections of the projecting portion 25 disposed on the back surface 21b of the body 21 will be omitted.

As shown in FIG. 2A and FIG. 3A, the projecting portion 25 is formed in a substantially chevron shape (substantially rectangular shape) in a plan view. An upper end 25a of the projecting portion 25 is provided only to a middle portion in the width direction of the body 21 (also referred to simply as the "width direction"), and is not provided to both ends in the width direction. A lower portion 25b of the projecting portion 25 is disposed from one end to the other end in the width direction of the body 21. Specifically, the lower portion 25b of the projecting portion 25 is provided across the entire width direction of the body 21. The projecting portion 25 is so formed as to have a width in the width direction of the body 21 gradually smaller from the lower portion 25b to the upper end 25a. The projecting portion 25 having the two projections has a symmetric shape relative to a center line of the width direction of the body 21.

A recessed portion 25c upwardly recessed is formed at an intermediate portion (middle portion) in the width direction of the lower portion 25b of the projecting portion 25. In other words, the lower portion 25b of the projecting portion 25 is branched into two in a plan view. In the present embodiment, the recessed portion 25c is disposed at the center in the width direction of the lower portion 25b of the projecting portion 25. The recessed portion 25c is formed in a substantially chevron shape (substantially rectangular shape) as shown in FIG. 2A and FIG. 3A in a plan view. Amount of recess d1 in the upward direction of the recessed portion 25c becomes the greatest at the center in the width direction of the lower portion 25b, and becomes the smallest at both ends in the width direction thereof. Specifically, an apex of the recessed portion 25c is located at the center in the width direction of the lower portion 25b. The apex of the recessed portion 25c has a curved shape in a plan view.

As aforementioned, the lower portion 25b of the projecting portion 25 is branched into two, and thus the surface of the lower portion 25b of the projecting portion 25 is not parallel in the width direction of the body 21. The surface of the lower portion 25b of the projecting portion 25 is tiltingly disposed relative to the width direction. The surface of the lower portion 25b of the projecting portion 25 is not parallel in the vertical direction, as well. The surface of the lower portion 25b of the projecting portion 25 is tiltingly disposed relative to the vertical direction. In the present embodiment, the surface of the lower portion 25b of the projecting portion 25 is divided into a first slope surface 25d and a second slope surface 25e. The first slope surface 25d is disposed to extend from a middle portion in the width direction of the lower portion 25b of the projecting portion 25 to one end in the width direction thereof from upward to downward of the projecting portion 25. As indicated by an arrow A1 of FIG. 4, the first slope surface 25d obliquely extends downward. The second slope surface 25e is disposed to extend from the middle portion in the width direction of the lower portion 25b of the projecting portion 25 to the other end in the width direction of the projecting portion 25 from upward to downward of the projecting portion 25. As indicated by an arrow A2 of FIG. 4, the second slope surface 25e obliquely extends downward. A distance w2 in the width direction between the first slope surface 25d and the second slope surface 25e becomes gradually greater from upward to downward of the projecting portion 25.

Each of the first slope surface 25d and the second slope surface 25e is formed in a manner as to stand up in a substantially vertical direction from the front surface 21a of the body 21. In the present embodiment, each of the first slope surface 25d and the second slope surface 25e substantially vertically stands up from a boundary position between the projecting portion 25 and the outer frame 26. After substantially vertically standing up, each of the first slope surface 25d and the second slope surface 25e is formed into a gently curved surface. The substantially entire surface of the projecting portion 25 is formed into a gently curved surface excluding a standing-up portion of each of the first slope surface 25d and the second slope surface 25e. The middle portion in the width direction of the projecting portion 25 includes a point located at a most projecting position from the front surface 21a in a direction vertical to the front surface 21a.

According to the oil level gauge 2 of the present embodiment, when the oil level gauge 2 is pulled out from the oil level gauge guide 3 for the purpose of inspecting the amount of the oil, it is possible to inhibit the oil from adhering to the surface (measurement surface) of the measurement portion 24. The oil level gauge 2 of the present embodiment is capable of accurately measuring the oil level. In more detail, the lower portion 25b of the projecting portion 25 of the oil level gauge 2 configured above functions as a restricting portion to restrict a running down direction of the oil adhering to the projecting portion 25 at the time of inspecting the amount of the oil. In other words, the surface of the lower portion 25b of the projecting portion 25 functions as a guide surface to guide the oil adhering to the projecting portion 25 at the time of the inspection of the amount of the oil to the ends in the width direction of the projecting portion 25. The surface of the lower portion 25b of the projecting portion 25 includes the first slope surface 25d and the second slope surface 25e.

Specifically, the oil adhering to the projecting portion 25 initially moves downward (runs down) by empty weight. When the oil reaches the first slope surface 25d, the oil runs down along the first slope surface 25d as indicated by the arrow A1 of FIG. 4. The oil is guided to one end in the width direction of the projecting portion 25. After the oil reaches the one end in the width direction of the projecting portion 25, the oil runs down along a side surface 21c. The side surface 21c is a surface of the one end in the width direction of the body 21. Similarly, after the oil adhering to the projecting portion 25 reaches the second slope surface 25e, the oil runs down along the second slope surface 25e as indicated by the arrow A2 of FIG. 4. The oil is guided to the other end in the width direction of the projecting portion 25. After the oil reaches the other end in the width direction of the projecting portion 25, the oil runs downward along the side surface 21d. The side surface 21d is a surface of the other end in the width direction of the body 21.

In this manner, the oil adhering to the surface of the projecting portion 25 is guided to the ends in the width direction of the projecting portion 25 by the first slope surface 25d and the second slope surface 25e provided to the lower portion 25b of the projecting portion 25 of the oil level gauge 2. The oil is inhibited from running down along the front surface 21a of the body 21 located downward of the projecting portion 25. Through this, the oil is inhibited from reaching the measurement portion 24 disposed downward of the projecting portion 25. Accordingly, adhesion of the oil to the surface of the measurement portion 24 can be prevented at the time of inspecting the amount of the oil. It is possible to accurately measure the oil level.

The width in the width direction of the recessed portion 25c, that is, the distance w2 in the width direction between the first slope surface 25d and the second slope surface 25e becomes gradually greater toward the downward direction; therefore, the oil adhering to the surface of the projecting portion 25 can be more securely guided to the ends in the width direction of the projecting portion 25. Accordingly, it is possible to prevent the oil from adhering to the surface of the measurement portion 24, thus accurately measuring the oil level.

In the aforementioned embodiment, the shape of the projecting portion 25 disposed to the oil level gauge 2 is formed to be a substantially chevron shape. However, the shape of the projecting portion 25 may be any shape other than the above shape as far as the lower portion 25b of the projecting portion 25 is disposed from one end to the other end in the width direction of the projecting portion 25, and the recessed portion is disposed to the intermediate portion in the width direction of the lower portion 25b. The shape of the projecting portion 25 may be different between that on the front surface 21a and that on the back surface 21b of the body 21. The recessed portion 25c is provided to the middle portion in the width direction of the lower portion 25b of the projecting portion 25, but the recessed portion 25c may be disposed at a position offset from the middle portion in the width direction. The shape of the recessed portion 25e may be any shape other than the above shape.

In the above embodiment, the projecting portion 25 is configured to be a separate member from the body 21 of the oil level gauge 2, but the projecting portion 25 may be integral with the body 21. The projecting portion 25 may be fixed to the body 21 through any means other than crimping. The aforementioned outer frame 26 may be omitted.

In the aforementioned embodiment, the oil level gauge used for an engine has been described, but the present disclosure may also be applicable to an oil level gauge used for any component other than an engine (e.g., transmission, or the like).

The aforementioned embodiment disclosed herein is merely exemplification in all respects, and does not constitute a basis of restrictive interpretation. Therefore, the technical scope of the present disclosure is not interpreted only by the aforementioned embodiment, but is defined based on the description of the claims. The technical scope of the present disclosure includes everything equivalent in meaning to the scope of the claims and all modifications therein.

The present disclosure is usable to an oil level gauge configured to be inserted into an oil level gauge guide so as to measure an oil level in an oil pan.

What is claimed is:

1. An oil level gauge configured to be inserted into an oil level gauge guide, the oil level gauge comprising a body,
   the body having a belt shape with a predetermined width,
   the body including
      a measurement portion configured to measure a position of an oil surface, and
      a projecting portion disposed more rearward in an inserting direction into the oil level gauge guide than the measurement portion, the projection portion including a first slope surface and a second slope surface, wherein
   the first slope surface and the second slope surface are positioned at a front end in the inserting direction of the projecting portion in such a manner that the first slope surface is inclined from an intermediate portion in a width direction of the front end to one end in the width direction, the first slope surface is inclined from rearward to forward of the inserting direction, the second slope surface is inclined from the intermediate portion in the width direction of the front end to an other end in the width direction, and the second slope surface is inclined from rearward to forward of the inserting direction.

2. The oil level gauge according to claim 1, wherein
   a distance in the width direction between the first slope surface and the second slope surface becomes gradually greater from rearward to forward of the inserting direction.

3. An oil level gauge configured to be inserted into an oil level gauge guide,
   the oil level gauge comprising a body having a belt shape, the body including an upper end, a lower end, a surface, a measurement portion, and a projecting portion, the upper end being located more upward in a vertical direction than the lower end when the oil level gauge is inserted into the oil level gauge guide, the projecting portion being located closer to the upper end than the measurement portion, the projecting portion projecting from the surface, the projecting portion including a middle portion a lower portion, a first slope surface and a second slope surface, the middle portion being located at a center in a width direction of the body in the projecting portion, the first slope surface and the second slope surface being located at the lower portion in the projecting portion, the first slope surface being inclined from the middle portion in the lower portion to a first end in the width direction in the lower portion, the second slope surface being inclined from the middle portion in the lower portion to a second end in the width direction in the lower portion, the middle portion including a most projecting position from the surface in a direction vertical to the surface, and the middle portion being located closer to the upper end than the first end and the second end.

4. The oil level gauge according to claim 3, wherein a distance in the width direction between the first slope surface and the second slope surface becomes gradually greater from the upper end to the lower end.

5. The oil level gauge according to claim 3, wherein the lower portion includes a recessed portion, the recessed portion is located between the first slope surface and the second slope surface, and the recessed portion is concave downward in the vertical direction when the oil level gauge is inserted into the oil level gauge guide.

\* \* \* \* \*